(12) United States Patent
Chen et al.

(10) Patent No.: US 12,191,502 B2
(45) Date of Patent: Jan. 7, 2025

(54) pH-UNIVERSAL AQUEOUS RECHARGEABLE HYDROGEN BATTERIES

(71) Applicants: EnerVenue Holdings, Ltd., Grand Cayman (KY); The Board of Trustees of the Leland Stanford Junior University, Stanford, CA (US)

(72) Inventors: Wei Chen, Redwood City, CA (US); Yi Cui, Stanford, CA (US)

(73) Assignees: EENOTECH, INC., Sunnyvale, CA (US); The Board of Trustees of the Leland Stanford Junior University, Stanford, CA (US)

( * ) Notice: Subject to any disclaimer, the term of this patent is extended or adjusted under 35 U.S.C. 154(b) by 451 days.

(21) Appl. No.: 16/373,247

(22) Filed: Apr. 2, 2019

(65) Prior Publication Data

US 2020/0321621 A1    Oct. 8, 2020

(51) Int. Cl.
    *H01M 4/86*    (2006.01)
    *H01M 4/56*    (2006.01)
    (Continued)

(52) U.S. Cl.
    CPC .......... *H01M 4/8615* (2013.01); *H01M 4/56* (2013.01); *H01M 4/923* (2013.01); *H01M 12/02* (2013.01);
    (Continued)

(58) Field of Classification Search
    CPC .... H01M 4/8615; H01M 12/08; H01M 12/02; H01M 4/56; H01M 4/923;
    (Continued)

(56) References Cited

U.S. PATENT DOCUMENTS

| 3,669,744 | A | * | 6/1972 | Tsenter et al. ...... H01M 10/345 |
| | | | | 429/223 |
| 4,159,367 | A | | 6/1979 | Heinz |

(Continued)

FOREIGN PATENT DOCUMENTS

| CA | 2624776 A1 * | 5/2007 | ............ B82Y 30/00 |
| CA | 2624776 C | 5/2015 | |

(Continued)

OTHER PUBLICATIONS

Chang et al., "Controllable synthesis of ruthenium phosphides (RuP and RuP2) for pH-universal hydrogen evolution reaction", ACS Sustainable Chem. Eng., 2018, vol. 6, No. 5, 23 pages, retrieved at https://pubs.acs.org/doi/abs/10.1021/acssuschemeng.8b00187.

(Continued)

*Primary Examiner* — Kaity V Chandler
(74) *Attorney, Agent, or Firm* — Sheppard, Mullin, Richter & Hampton LLP

(57) ABSTRACT

Described are aqueous rechargeable hydrogen batteries operating in the full pH range (e.g., pH: −1 to 15) with potential for electrical grid storage. The pH-universal hydrogen batteries operate with different redox chemistry on the cathodes and reversible hydrogen evolution/oxidation reactions (HER/HOR) on the anode. The reactions can be catalyzed by a highly active ruthenium-based electrocatalyst. The ruthenium-based catalysts exhibit comparable specific activity and superior long-term stability of HER/HOR to that of state-of-the-art Pt/C electrocatalyst in the full pH range. New chemistries for aqueous rechargeable hydrogen batteries are also provided.

16 Claims, 10 Drawing Sheets

(51) Int. Cl.
*H01M 4/92* (2006.01)
*H01M 12/02* (2006.01)
*H01M 12/08* (2006.01)

(52) U.S. Cl.
CPC .... *H01M 12/08* (2013.01); *H01M 2300/0011* (2013.01)

(58) Field of Classification Search
CPC . H01M 2300/0011; H01M 2300/0014; H01M 2300/0002; Y02E 60/10; Y02E 60/50; Y02E 60/13; Y02E 60/36; Y02E 30/10; Y02E 30/00; Y02E 60/32; Y02E 60/00
See application file for complete search history.

(56) References Cited

U.S. PATENT DOCUMENTS

| | | | |
|---|---|---|---|
| 4,467,020 A | 8/1984 | Puglisi | |
| 4,501,803 A | 2/1985 | Bannochie | |
| 5,746,064 A * | 5/1998 | Tsenter | F25B 17/12 |
| | | | 62/480 |
| 8,721,866 B2 * | 5/2014 | Sivasankar | C25B 1/00 |
| | | | 205/639 |
| 9,305,716 B2 * | 4/2016 | Tan | H01M 12/02 |
| 10,211,494 B1 * | 2/2019 | Tsenter | H01M 16/003 |
| 2005/0132562 A1 * | 6/2005 | Saito | H01M 4/0404 |
| | | | 29/623.5 |
| 2005/0142428 A1 * | 6/2005 | Daimon | H01M 4/8605 |
| | | | 429/492 |
| 2011/0114504 A1 * | 5/2011 | Sivasankar | C25B 1/02 |
| | | | 205/334 |
| 2011/0223494 A1 | 9/2011 | Feaver et al. | |
| 2012/0149789 A1 * | 6/2012 | Greenbaum | C10G 45/02 |
| | | | 204/266 |
| 2013/0084474 A1 | 4/2013 | Mills | |
| 2014/0162108 A1 * | 6/2014 | Visco | H01M 50/466 |
| | | | 429/131 |
| 2015/0311536 A1 | 10/2015 | Atanasoska et al. | |
| 2016/0079604 A1 * | 3/2016 | Atanasoski | H01M 4/9008 |
| | | | 427/596 |
| 2016/0148759 A1 | 5/2016 | El-Kady et al. | |
| 2017/0187046 A1 | 6/2017 | Huang et al. | |
| 2018/0013144 A1 * | 1/2018 | Li | H01M 4/42 |
| 2018/0277884 A1 * | 9/2018 | Zhamu | H01M 4/38 |
| 2019/0051907 A1 | 2/2019 | Cui et al. | |
| 2019/0372151 A1 * | 12/2019 | Zhamu | H01M 4/133 |

FOREIGN PATENT DOCUMENTS

| | | | | |
|---|---|---|---|---|
| CN | 101332426 A | * | 12/2008 | H01M 4/90 |
| CN | 102959769 A | * | 3/2013 | H01G 11/28 |
| CN | 107112144 A | * | 8/2017 | C01B 32/184 |
| CN | 107362818 | * | 11/2017 | C25B 11/091 |
| CN | 107362818 A | * | 11/2017 | C25B 11/091 |
| CN | 106030872 B | * | 12/2018 | C01G 45/1228 |
| JP | S5963666 A | | 4/1984 | |
| JP | S59141176 A | | 8/1984 | |
| JP | 2016503723 A | | 2/2016 | |
| JP | 2017170426 A | | 9/2017 | |
| WO | WO-2014008030 A1 | * | 1/2014 | H01M 12/06 |
| WO | 2018222609 A1 | | 12/2018 | |
| WO | 2019032704 A1 | | 2/2019 | |

OTHER PUBLICATIONS

International Search Report and Written Opinion for PCT/US2020/026141 dated Jul. 9, 2020, 9 pages.
Pu et al., "RuP2-Based Catalysts with Platinum-like Activity and Higher Durability for the Hydrogen Evolution Reaction at All pH Values", Angewandte Chemie International Edition, Verlag Chemie, vol. 56, No. 38, Aug. 7, 2017, pp. 11559-11564.

* cited by examiner pH-UNIVERSAL AQUEOUS RECHARGEABLE HYDROGEN BATTERIES

BACKGROUND

There is a growing demand for energy technology with minimal impact on the environment. Hydrogen batteries are rechargeable batteries based on gaseous hydrogen, a non-toxic substance which poses little threat to the surrounding ecosystem. Large-scale storage of renewable energy in rechargeable batteries provides an opportunity for the development of a green-grid. However, the existing hydrogen battery technologies could hardly fulfill the requirements of grid-storage. Hydrogen batteries utilizing new catalysts, or new chemistries for stationary energy storage represent an improvement toward an environmentally friendly energy grid.

SUMMARY

Rechargeable hydrogen-metal batteries utilizing ruthenium-based catalysts are described herein. Utilizing various different chemistries, the new ruthenium-based catalysts are capable of operating over all aqueous pH ranges (e.g., pH: −1 to 15) when paired with the appropriate electrolytes and electrodes. The batteries can be constructed of two electrodes separated by an electrolyte, wherein one electrode includes a ruthenium-based, bi-functional catalyst capable of catalyzing both hydrogen evolution and hydrogen oxidation reactions. Further described herein are new chemistries for hydrogen-metal batteries which can work with a variety of different catalysts.

One embodiment of the present disclosure provides a metal-hydrogen battery, comprising a first electrode; a second electrode; and an electrolyte disposed between the first electrode and the second electrode, wherein the second electrode includes a bi-functional catalyst to catalyze hydrogen evolution reaction and hydrogen oxidation reaction at the second electrode, and wherein the bi-functional catalyst comprises ruthenium or a ruthenium-containing compound.

Also provided, in one embodiment, is a metal-hydrogen battery, comprising a first electrode comprising lead oxide; a second electrode; and an acidic electrolyte disposed between the first electrode and the second electrode, wherein the second electrode includes a bi-functional catalyst to catalyze hydrogen evolution reaction and hydrogen oxidation reaction at the second electrode. In some embodiments, the lead oxide is selected from the group consisting of $PbO_2$, PbO, and $PbO_2$ doped with one or more elements selected from the group consisting of Sb, Cr, and Ca. In some embodiments, the acidic electrolyte comprises $H_2SO_4$.

Another embodiment provides a metal-hydrogen battery, comprising: a first electrode comprising an inorganic lithium compound; a second electrode; and an electrolyte disposed between the first electrode and the second electrode, wherein the second electrode includes a bi-functional catalyst to catalyze hydrogen evolution reaction and hydrogen oxidation reaction at the second electrode.

BRIEF DESCRIPTION OF THE DRAWINGS

The drawings described herein are for illustration purposes only. The drawings are not intended to limit the scope of the present disclosure.

Figure 1:
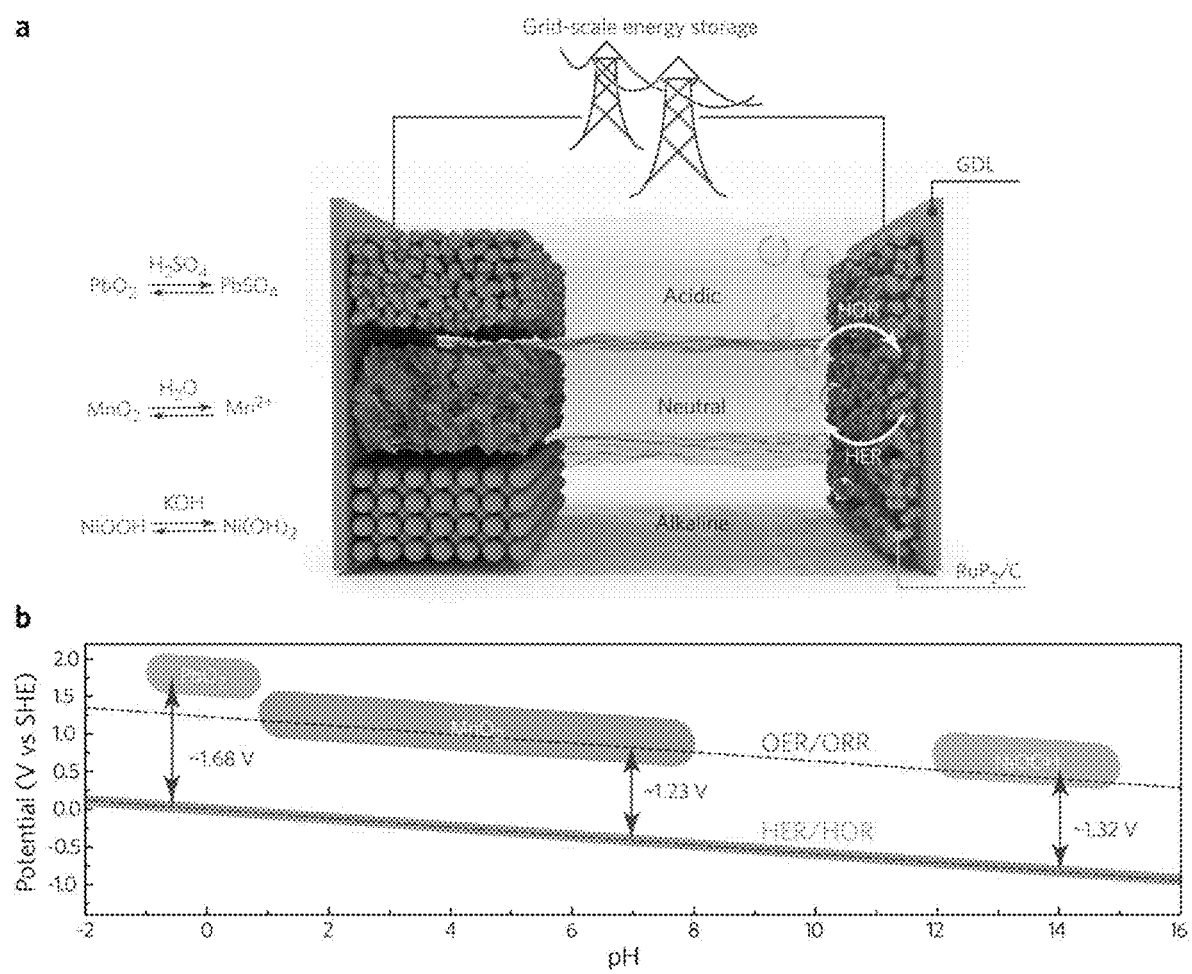
FIG. 1 shows a) schematic of a pH-universal, aqueous rechargeable hydrogen battery and b) a Pourbaix diagram of their redox potentials.

Reference is now made in detail to certain embodiments of the present disclosure. While certain embodiments of the present disclosure are described, it will be understood that it is not intended to limit the embodiments of the present disclosure to the disclosed embodiments. To the contrary, reference to embodiments of the present disclosure is intended to cover alternatives, modifications, and equivalents as may be included within the spirit and scope of the embodiments of the present disclosure as defined by the appended claims.

DETAILED DESCRIPTION

For purposes of the following description, it is to be understood that embodiments provided by the present disclosure may assume various alternative variations and step sequences, except where expressly specified to the contrary. Moreover, other than in the examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10. Also, in this application, the use of "or" means "and/or" unless specifically stated otherwise, even though "and/or" may be explicitly used in certain instances.

Electrochemical cells refer to devices for storing and generating electrical energy including batteries. Electrochemical cells provided by the present disclosure can be rechargeable.

The increasing interest of using aqueous rechargeable batteries as alternative energy storage systems shows promise owing to their favorable features of low-cost, non-flammable water based electrolytes and environmental benignity. However, state-of-the-art aqueous batteries such as lead-acid (Pb-acid), nickel-metal hydride (Ni-MH), and aqueous lithium/sodium (Li/Na) ion batteries suffer undesirable characteristics of poor cycle life and low energy density, deviating them from large-scale energy storage applications. For example, Pb-acid batteries show short life of ~500 cycles due to the well-known sulfation of Pb anode, which forms irreversible $PbSO_4$ and induces active material loss and cell failure. The MH anodes in the Ni-MH batteries undergo unstable cycle life due to the repeated volume expansion/contraction during battery charge/discharge. The recently developed aqueous Li/Na ion batteries ($LiMn_2O_4$-activated carbon, Prussian blue-polypyrrole) show good cycle life, but their energy densities are limited by the utilization of low capacity anode materials. The challenge of the aqueous rechargeable batteries with desirable performance for large-scale storage is thus significantly reliant on the deployment of the anode materials that are of low cost, high capacity and chemically/electrochemically stability in various aqueous electrolytes. The development of aqueous rechargeable batteries with new energy storage chemistry is of highly desirable yet very challenging.

The present disclosure, in some embodiments, describes a family of aqueous rechargeable hydrogen batteries operating in the full pH range (pH: −1 to 15) with potential for electrical grid storage.

These pH universal batteries, as described herein in various embodiments, provide new chemistries to construct high-energy, high-power, long-lifetime, low-cost and safe energy storage systems. The pH-universal hydrogen batteries operate with different redox chemistry on the cathodes by either conversion reactions e. g., ($PbO_2$ in 4.5 M $H_2SO_4$; $LiMn_2O_4$ in 1 M $LiSO_4$; $Ni(OH)_2$ in 30% KOH) or $MnO_2$ deposition/stripping reaction (3M $MnSO_4$ in neutral and acidic electrolytes) and reversible hydrogen evolution/oxidation reactions (HER/HOR) on the anode, which are catalyzed by a highly active ruthenium phosphide electrocatalyst. The ruthenium phosphide exhibits comparable specific activity and superior long-term stability of HER/HOR to that of state-of-the-art Pt/C electrocatalyst in the full pH range. The pH-universal hydrogen batteries exhibit exceptional electrochemical performance including high operating potentials (~1.75 V for Pb—$H_2$ cell; ~1.3 V for LMO-$H_2$, Mn—$H_2$ and Ni—$H_2$ cells), large capacities (~200 mAh g$^{-1}$ for Pb—$H_2$ and Ni—$H_2$ cell; ~108 mAh g$^{-1}$ for LMO-$H_2$ cell; ~125 Ah L$^{-1}$ for Mn—$H_2$ cell), long cycle life (>3000 cycles for Pb—$H_2$ cell; >5000 cycles for Mn—$H_2$ cell; >1000 cycles for Ni—$H_2$ cell) and fast kinetics (>100C for Pb—$H_2$ cell; >50C for Mn—$H_2$ cell).

Ruthenium Catalyzed Hydrogen Batteries

In some embodiments, a metal-hydrogen battery is comprised of a first electrode, a second electrode comprised of a bi-functional catalyst comprised of ruthenium or ruthenium-containing compounds, and an electrolyte positioned between the first electrode and the second electrode. The bi-functional catalyst catalyzes hydrogen evolution reaction and hydrogen oxidation reactions at the second electrode.

A battery is an electrochemical cell that stores electrical energy in the form of chemical energy. As the battery charges or discharges, redox reactions either store energy for later use or release energy in the form of work done by allowing molecules to assume lower energy states. Rechargeable batteries are batteries that can be used to store energy more than once. As energy is depleted, more energy may be applied to the system in the form of electric current to replete its store.

The redox reactions that are involved in energy storage and release take place at electrodes, which are conductive, discrete, solid components that must be electrically isolated from each other but in mutual contact with a conductive medium-containing the compounds to be oxidized and/or reduced.

Catalysts are compounds that lower the activation energy of a chemical reaction, allowing it to proceed with less energy input. In the disclosure, the bi-functional catalyst is capable of catalyzing both hydrogen evolution and hydrogen oxidation reactions. Thereby, making the battery capable of being recharged.

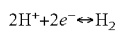

$$2H^+ + 2e^- \leftrightarrow H_2$$

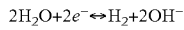

$$2H_2O + 2e^- \leftrightarrow H_2 + 2OH^-$$

Electrolytes are salts that dissociate into cations and anions and thereby conduct ions. In the context of the invention, the electrolyte is what allows the movement of ions between the first electrode and the second electrode. This occurs by accepting the electrons liberated via reduction reactions at one electrode and then transferring the ions via oxidation reactions at another electrode.

Ruthenium is a transition metal. Ruthenium-containing compounds are inorganic compounds, salts, metal alloys, coordination complexes, and organometallics that include ruthenium. Ruthenium-containing compounds also encompass substances that have been doped with ruthenium.

In some embodiments, the bi-functional catalyst is comprised of ruthenium-containing compounds such as ruthenium phosphides, ruthenium sulfides, ruthenium phosphide-sulfide alloys, ruthenium carbides, ruthenium nitrides, or combinations thereof. In some embodiments, the ruthenium-containing compounds are ruthenium alloys (e.g., ruthenium phosphides, ruthenium sulfides, ruthenium phosphide-sulfide alloys). In some embodiments, the ruthenium-containing compound is ruthenium phosphide.

In some embodiments, the bi-functional catalyst is a ruthenium phosphide on carbon, $RuP_2/C$. In some embodiments, the bi-functional catalyst is ruthenium on carbon, Ru/C. In some embodiments, the bi-functional catalysts of the metal-hydrogen battery consist of mixture of different materials, which contribute to hydrogen evolution and oxidation reactions as a whole.

In some embodiments, the first electrode is a cathode, and the second electrode is an anode. In some embodiments, the second electrode is an anode or a cathode.

In some embodiments of the pH-universal metal-hydrogen batteries, the second electrode is a catalytic hydrogen electrode. In some embodiments, the second electrode includes a conductive substrate and a coating covering the conductive substrate. In some embodiments, the coating includes microstructures of the redox-reactive material, such as having sizes (or an average size) in a range of about 1 μm to about 100 μm, about 1 μm to about 50 μm, or about 1 μm to about 10 μm. In some embodiments the bi-functional catalyst is present in the coating to catalyze both hydrogen evolution reaction and hydrogen oxidation reaction at the second electrode. In some embodiments, the coating includes nanostructures of the bi-functional catalyst. These nanostructures having sizes (or an average size) in a range of about 1 nm to about 100 nm, about 1 nm to about 80 nm, or about 1 nm to about 50 nm.

In some embodiments, a transition metal is included in the redox-reactive material and it can be lead. In some embodiments, lead is included as lead dioxide or lead monoxide. In some embodiments, the transition metal included in the redox-reactive material is manganese. In some embodiments, manganese is included as manganese oxide, lithium manganese oxides ($LiMn_2O_4$) or doped manganese oxide (e.g., doped with nickel and cobalt or other transition metals). In some embodiments, the transition metal included in the redox-reactive material is nickel. In some embodiments, nickel is included as nickel hydroxide or nickel oxyhydroxide. In some embodiments, some transition metals such as zinc and cobalt are included in the nickel hydroxide or nickel oxyhydroxide.

Other transition metals and metal oxides are encompassed by this disclosure, such as cobalt, iron, nickel, etc. In some embodiments, cobalt is included as cobalt oxide and lithium cobalt oxides ($LiCoO_2$). In some embodiments, iron is included as iron oxide, lithium iron oxide ($LiFeO_2$) and lithium iron phosphate ($LiFePO_4$). In some embodiments, nickel is included as nickel oxide and lithium nickel oxide ($LiNiO_2$).

Other mixed transition metal oxides are encompassed by this disclosure, such as lithium cobalt nickel oxide, lithium cobalt magnesium oxide, lithium manganese cobalt oxide, lithium manganese chromium oxide, and lithium nickel manganese cobalt oxide. In some embodiments, the first electrode include polyanion compounds, such as lithium cobalt phosphate, lithium vanadium oxide phosphate and lithium vanadium phosphate fluoride.

In some embodiments, the conductive substrate is porous, such as having a porosity of at least about 10%, at least about 20%, at least about 30%, at least about 40%, or at least about 50%, and up to about 80%, up to about 90%, or greater.

In some embodiments, the conductive substrate is a metal foam, such as a nickel foam. Other conductive substrates are encompassed by this disclosure, such as metal foils, metal meshes, metal foils, and fibrous conductive substrates.

In some embodiments, the conductive substrate comprises a carbonaceous material. In some embodiments, the carbonaceous material is selected from the group consisting of carbon nanofiber paper, carbon cloth, carbon mat, carbon felt, carbon mat, carbon nanotube film, graphite foil, graphite foam, graphite mat, graphene foil, graphene fibers, graphene film, and graphene foam. Other conductive carbonaceous substrates are encompassed by this disclosure.

Some embodiments of this disclosure are directed to a series of pH-universal metal-hydrogen batteries, which include a first electrode, a second electrode, a separator placed between the first electrode and the second electrode, and an electrolyte disposed between the first electrode and the second electrode.

In some embodiments of the pH-universal metal-hydrogen battery, the separator is a porous, water absorptive and insulating film. In some embodiments, the separator includes cellulose fibers, polymers such as polypropylene, polyethylene, polyvinyl chloride, polyvinyl alcohol and nylon, fabrics such as glass fiber mat, zirconia oxide coated cloth, and other water absorptive substances. In some embodiments, the separator is porous, such as having a porosity of at least about 10%, at least about 20%, at least about 30%, at least about 40%, or at least about 50%, and up to about 80%, up to about 90%, or greater.

In some embodiments, the electrolyte is an aqueous electrolyte. Herein is reported a family of aqueous rechargeable batteries with different storage chemistry that are enabled by a platinum-free, pH-universal catalytic hydrogen anode. In order to demonstrate the generality of the hydrogen anode to different charge storage mechanisms, four industrial well-developed cathodes, including $PbO_2$, $MnO_2$ and $LiMn_2O_4$, as well as $Ni(OH)_2$, are applied to our pH-universal hydrogen batteries in acidic, neutral and alkaline electrolytes, respectively. FIG. 1 panel a shows the schematic of the four aqueous hydrogen batteries, denoting as Pb—$H_2$, Mn—$H_2$, LMO-$H_2$, and Ni—$H_2$, which are operated under different pH ranges. The pH-universal hydrogen anode was fabricated by a highly active HER/HOR electrocatalyst of $RuP_2$/C on a carbon fiber gas diffusion layer. The electrical charge storage mechanisms of the pH-universal hydrogen batteries are described in the following example equations.

In the acidic Pb—$H_2$ battery:

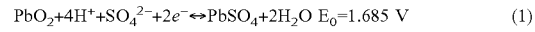
$$PbO_2+4H^++SO_4^{2-}+2e^-\leftrightarrow PbSO_4+2H_2O \quad E_0=1.685\ V \tag{1}$$

$$2H^++2e^-\leftrightarrow H_2 \quad E_0=0\ V \tag{2}$$

$$PbO_2H_2SO_4+H_2\leftrightarrow PbSO_4+2H_2O \quad E_0=1.685\ V \tag{3}$$

In the neutral and acidic Mn—$H_2$ battery:

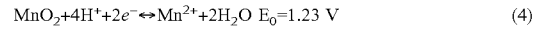
$$MnO_2+4H^++2e^-\leftrightarrow Mn^{2+}+2H_2O \quad E_0=1.23\ V \tag{4}$$

$$2H^++2e^-\leftrightarrow H_2 \quad E_0=0\ V \tag{5}$$

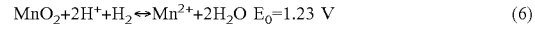
$$MnO_2+2H^++H_2\leftrightarrow Mn^{2+}+2H_2O \quad E_0=1.23\ V \tag{6}$$

In the neutral LMO-$H_2$ battery:

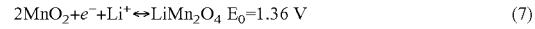
$$2MnO_2+e^-+Li^+\leftrightarrow LiMn_2O_4 \quad E_0=1.36\ V \tag{7}$$

$$2H^++2e^-\leftrightarrow H_2 \quad E_0=0\ V \tag{8}$$

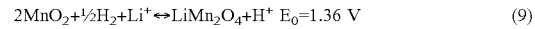
$$2MnO_2+½H_2+Li^+\leftrightarrow LiMn_2O_4+H^+ \quad E_0=1.36\ V \tag{9}$$

In the alkaline Ni—$H_2$ battery:

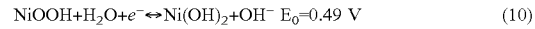
$$NiOOH+H_2O+e^-\leftrightarrow Ni(OH)_2+OH^- \quad E_0=0.49\ V \tag{10}$$

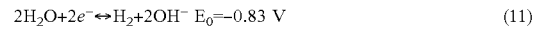
$$2H_2O+2e^-\leftrightarrow H_2+2OH^- \quad E_0=-0.83\ V \tag{11}$$

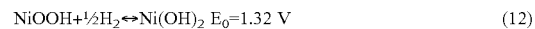
$$NiOOH+½H_2\leftrightarrow Ni(OH)_2 \quad E_0=1.32\ V \tag{12}$$

In battery charge and discharge processes, the cathode of the acidic Pb—$H_2$ battery is cycled through convention reaction between $PbO_2$ and $PbSO_4$ in 4.5 M $H_2SO_4$ electrolyte. In the neutral and acidic Mn—$H_2$ battery, the cathode is cycled through manganese deposition/stripping reaction between soluble $Mn^{2+}$ and solid $MnO_2$ in 3 M $MnSO_4$ electrolyte. In the neutral LMO-$H_2$ battery, the cathode is cycled through convention reaction between $LiMn_2O_4$ and $MnO_2$ in 1 M $Li_2SO_4$ electrolyte. In the alkaline Ni—$H_2$ battery, the cathode is cycled through convention reaction between $Ni(OH)_2$ and NiOOH in 30% KOH electrolyte. While in these four hydrogen batteries, the anodes are cycled via HER/HOR by using $Ru_2P/C$ electrocatalyst in different electrolytes. Other electrocatalysts can be used with these chemistries. The redox potentials of the pH-universal hydrogen batteries with different cathodes are described in the Proubiax diagram (FIG. 1 panel b). The rechargeable hydrogen batteries with different redox chemistries can be achieved by pairing any cathodes with the robust pH-universal hydrogen anode, which are difficult to be realized by any other single material or electrode. It is noted that the pH-universal hydrogen batteries are not limited to the ones demonstrated in this work; rather there is an entire family of rechargeable batteries to be explored.

In some embodiments, the aqueous electrolyte is acidic. In some embodiments, the aqueous electrolyte has a pH of about 7 or below, such as about 6.5 or below, about 6 or below, about 5.5 or below, about 5 or below, about 4.5 or below, about 4 or below, about 3.5 or below, about 3 or below, about 2.5 or below, about 2 or below, or about 1.5 or below.

In some embodiments, the acidic electrolyte comprises $H_2SO_4$. In some embodiments, the aqueous electrolyte includes $H_2SO_4$ in a concentration range of about 0.1 molar (M) to about 10 M, such as about 0.1 M to about 10 M, about 0.1 M to about 6 M, about 0.1 M to about 3 M, about 0.5 M to about 2 M, or about 0.5 M to about 1.5 M.

In some embodiments, the first electrode comprises lead oxide. Non-limiting examples include PbO, $PbO_2$, and $PbO_2$ doped with one or more elements selected from the group consisting of Sb, Cr, and Ca.

In some embodiments, the aqueous electrolyte has a pH below 10. In some embodiments, the aqueous electrolyte has a pH of around 7, such as about 6.5 to about 9, about 7 to about 9, about 7.5 to about 9, about 8 to about 9 or about 8.5 to about 9.

In some embodiments, where the aqueous electrolyte has a pH below 10, the aqueous electrolyte includes manganese ions. In some of these embodiments, the manganese ions include $Mn^{2+}$, although manganese ions having other oxidation states can be included. In some embodiments, a concentration of the manganese ions is in a range of about 0.1 molar (M) to about 4 M, such as about 0.1 M to about 4 M, about 0.1 M to about 3 M, about 0.1 M to about 2 M, about 0.5 M to about 2 M, or about 0.5 M to about 1.5 M. In some embodiments, the electrolyte comprises a material selected from the group consisting of $MnCl_2$, $MnSO_4$, $Mn(NO_3)_2$, and $Mn(CH_3COO)_2$. In some of these embodiments, the electrolyte further comprises $H_2SO_4$.

In some embodiments, where the aqueous electrolyte has a pH below 10, the aqueous electrolyte is configured to support precipitation of manganese over the porous, conductive support as manganese oxide. In some of these embodiments, the manganese oxide includes gamma manganese oxide. In some embodiments, the electrolyte is configured to support precipitation of manganese over the porous, conductive support as nanosheets or other nanostructures of manganese oxide.

In some embodiments, where the aqueous electrolyte has a pH below 10, the aqueous electrolyte comprises a salt of lithium. In some embodiments, the electrolyte comprises a salt selected from the group consisting of $Li_2SO_4$, LiCl, $LiNO_3$, $LiClO_4$, $Li_2CO_3$, $Li_3PO_4$, LiF, $LiPF_6$, $LiBF_4$. In some of these embodiments, the aqueous electrolyte includes lithium sulfate in a concentration range of about 0.1 molar (M) to about 5 M, such as about 0.1 M to about 5 M, about 0.1 M to about 4 M, about 0.1 M to about 3 M, about 0.1 M to about 2 M, about 0.1 M to about 1 M or about 0.1 M to about 0.5 M.

In some embodiments, the first electrode comprises a material selected from the group consisting of $LiMn_2O_4$, $LiCo_2O_4$, $LiFeO_2$, $LiNiO_2$, $LiFePO_4$, lithium cobalt nickel oxide, lithium cobalt magnesium oxide, lithium manganese cobalt oxide, lithium manganese chromium oxide, lithium nickel manganese cobalt oxide, lithium cobalt phosphate, lithium vanadium oxide phosphate, and lithium vanadium phosphate fluoride.

In some embodiments, the aqueous electrolyte is alkaline. In some embodiments, the aqueous electrolyte has a pH of higher than 7, such as about 7 to about 8, about 7 to about 9, about 7 to about 10, about 7 to about 11, about 7 to about 12, about 7 to about 13, or about 7 to about 14 or greater.

In some embodiments, the alkaline electrolyte comprises an alkali. In some embodiments, the alkali electrolyte is selected from the group consisting of KOH, NaOH, LiOH, and combinations thereof. In some embodiments, the aqueous electrolyte includes potassium hydroxide in a concentration range of about 0.1 molar (M) to about 10 M, such as about 0.1 M to about 10 M, about 0.1 M to about 8 M, about 0.1 M to about 5 M, about 0.1 M to about 3 M, about 0.1 M to about 2 M or about 0.1 M to about 1 M.

In some embodiments, the aqueous electrolyte includes other metal-containing compounds, such as sodium sulfate, sodium chloride, sodium nitrate, sodium phosphate, sodium perchlorate, potassium sulfate, potassium chloride, potassium nitrate, potassium phosphate, or potassium perchlorate.

In some embodiments, the battery further comprises an enclosure within which the first electrode, the second electrode, and the electrolyte are disposed. The enclosure includes an inlet valve, an inlet, which is fluidly connected to the inlet valve, an outlet valve, and an outlet, which is fluidly connected to the outlet valve.

In some embodiments, the battery further comprises a storage tank to store hydrogen gas, and a pump fluidly connected between the outlet, through the outlet valve, and the storage tank.

A schematic of an example of a battery provided by the present disclosure is shown in FIG. 1 panel a. Other configurations of the battery than the configuration illustrated in FIG. 1 panel a are possible.

New Chemistries for Hydrogen Batteries

Further described herein are batteries utilizing new chemistries for pH universal batteries that are capable of functioning with a variety of bi-functional catalysts.

In some embodiments, provided are hydrogen batteries utilizing chemistries illustrated in reaction equations (1)-(3). These batteries can operate with acidic electrolytes. In some embodiments, a battery is provided that is comprised of: a first electrode comprising lead oxide; a second electrode which includes a bi-functional catalyst to catalyze hydrogen evolution reaction and hydrogen oxidation reaction at the second electrode; and an acidic electrolyte disposed between the first electrode and the second electrode.

Non-limiting examples of lead oxide include PbO, $PbO_2$, and $PbO_2$ doped with one or more elements selected from the group consisting of Sb, Cr, and Ca.

In some embodiments, the acidic electrolyte has a pH of about 7 or below, such as about 6.5 or below, about 6 or below, about 5.5 or below, about 5 or below, about 4.5 or below, about 4 or below, about 3.5 or below, about 3 or below, about 2.5 or below, about 2 or below, or about 1.5 or below.

In some embodiments, the acidic electrolyte comprises $H_2SO_4$. In some embodiments, the aqueous electrolyte includes $H_2SO_4$ in a concentration range of about 0.1 molar (M) to about 10 M, such as about 0.1 M to about 10 M, about 0.1 M to about 6 M, about 0.1 M to about 3 M, about 0.5 M to about 2 M, or about 0.5 M to about 1.5 M.

In some embodiments, provided are hydrogen batteries utilizing chemistries illustrated in reaction equations (7)-(9). These batteries can operate with neutral or acidic electrolytes. In some embodiments, a battery is provided that is comprised of: a first electrode comprising an inorganic lithium compound; a second electrode which includes a bi-functional catalyst to catalyze hydrogen evolution reaction and hydrogen oxidation reaction at the second electrode; and an electrolyte disposed between the first electrode and the second electrode.

Non-limiting examples of inorganic lithium compound include $LiMn_2O_4$, $LiCo_2O_4$, $LiFeO_2$, $LiNiO_2$, $LiFePO_4$, lithium cobalt nickel oxide, lithium cobalt magnesium oxide, lithium manganese cobalt oxide, lithium manganese chromium oxide, lithium nickel manganese cobalt oxide, lithium cobalt phosphate, lithium vanadium oxide phosphate and lithium vanadium phosphate fluoride.

In some embodiments, the electrolyte includes a salt of lithium. Non-limiting examples of lithium salt include $Li_2SO_4$, $LiCl$, $LiNO_3$, $LiClO_4$, $Li_2CO_3$, $Li_3PO_4$, $LiF$, $LiPF_6$, and $LiBF_4$. In some of these embodiments, the aqueous electrolyte includes lithium sulfate in a concentration range of about 0.1 molar (M) to about 5 M, such as about 0.1 M to about 5 M, about 0.1 M to about 4 M, about 0.1 M to about 3 M, about 0.1 M to about 2 M, about 0.1 M to about 1 M or about 0.1 M to about 0.5 M.

In some embodiments, the bi-functional catalyst is comprised of a transition metal or one or more transition metal-containing compound. In some embodiments, the bi-functional catalyst includes one or more transition metal phosphides, such as nickel phosphide, cobalt phosphide, molybdenum phosphide, tungsten phosphide, silver phosphide, and their composites. Other precious metals and their alloys as bi-functional catalysts are encompassed by this disclosure, such as platinum, palladium, iridium, gold, rhodium, silver, and their alloys with precious and non-precious transition metals such as platinum, palladium, ruthenium, iridium, gold, rhodium, silver, nickel, cobalt, manganese, iron, molybdenum, tungsten, etc. In some embodiments, the anode catalysts are a combination of hydrogen evolution reaction and hydrogen oxidation reaction catalysts. In some embodiments, the bi-functional catalysts of the metal-hydrogen battery consist of mixture of different materials, which contribute to hydrogen evolution and oxidation reactions as a whole.

In some embodiments, the bi-functional catalyst is comprised of platinum. In some embodiments, the bi-functional catalyst is platinum on carbon, Pt/C.

In some embodiments, the first electrode is a cathode, and the second electrode is an anode. In some embodiments, the second electrode is an anode or a cathode.

In some embodiments of the metal-hydrogen batteries, the second electrode is a catalytic hydrogen electrode. In some embodiments, the second electrode includes a conductive substrate and a coating covering the conductive substrate. In some embodiments, the coating includes microstructures of the redox-reactive material, such as having sizes (or an average size) in a range of about 1 μm to about 100 μm, about 1 μm to about 50 μm, or about 1 μm to about 10 μm. In some embodiments the bi-functional catalyst is present in the coating to catalyze both hydrogen evolution reaction and hydrogen oxidation reaction at the second electrode. In some embodiments, the coating includes nanostructures of the bi-functional catalyst. These nanostructures having sizes (or an average size) in a range of about 1 nm to about 100 nm, about 1 nm to about 80 nm, or about 1 nm to about 50 nm.

In some embodiments, the transition metal included in the redox-reactive material is lead. In some embodiments, lead is included as lead dioxide or lead monoxide. In some embodiments, the transition metal included in the redox-reactive material is manganese. In some embodiments, manganese is included as manganese oxide, lithium manganese oxides ($LiMn_2O_4$) or doped manganese oxide (e.g., doped with nickel and cobalt or other transition metals). In some embodiments, the transition metal included in the redox-reactive material is nickel. In some embodiments, nickel is included as nickel hydroxide or nickel oxyhydroxide. In some embodiments, some transition metals such as zinc and cobalt are included in the nickel hydroxide or nickel oxyhydroxide.

Other transition metals and metal oxides are encompassed by this disclosure, such as cobalt, iron, nickel, etc. In some embodiments, cobalt is included as cobalt oxide and lithium cobalt oxides ($LiCoO_2$). In some embodiments, iron is included as iron oxide, lithium iron oxide ($LiFeO_2$) and lithium iron phosphate ($LiFePO_4$). In some embodiments, nickel is included as nickel oxide and lithium nickel oxide ($LiNiO_2$).

Other mixed transition metal oxides are encompassed by this disclosure, such as lithium cobalt nickel oxide, lithium cobalt magnesium oxide, lithium manganese cobalt oxide, lithium manganese chromium oxide, and lithium nickel manganese cobalt oxide. In some embodiments, the first electrode include polyanion compounds, such as lithium cobalt phosphate, lithium vanadium oxide phosphate and lithium vanadium phosphate fluoride.

In some embodiments, the conductive substrate is porous, such as having a porosity of at least about 10%, at least about 20%, at least about 30%, at least about 40%, or at least about 50%, and up to about 80%, up to about 90%, or greater.

In some embodiments, the conductive substrate is a metal foam, such as a nickel foam. Other conductive substrates are encompassed by this disclosure, such as metal foils, metal meshes, metal foils, and fibrous conductive substrates.

In some embodiments, the conductive substrate comprises a carbonaceous material. In some embodiments, the carbonaceous material is selected from the group consisting of carbon nanofiber paper, carbon cloth, carbon mat, carbon felt, carbon mat, carbon nanotube film, graphite foil, graphite foam, graphite mat, graphene foil, graphene fibers, graphene film, and graphene foam. Other conductive carbonaceous substrates are encompassed by this disclosure.

In some embodiments of the metal-hydrogen battery, the separator is a porous, water absorptive and insulating film. In some embodiments, the separator includes cellulose fibers, polymers such as polypropylene, polyethylene, polyvinyl chloride, polyvinyl alcohol and nylon, fabrics such as glass fiber mat, zirconia oxide coated cloth, and other water absorptive substances. In some embodiments, the separator is porous, such as having a porosity of at least about 10%, at least about 20%, at least about 30%, at least about 40%, or at least about 50%, and up to about 80%, up to about 90%, or greater.

In some embodiments, the battery further comprises an enclosure within which the first electrode, the second electrode, and the electrolyte are disposed. The enclosure includes an inlet valve, an inlet, which is fluidly connected to the inlet valve, an outlet valve, and an outlet, which is fluidly connected to the outlet valve.

In some embodiments, the battery further comprises a storage tank to store hydrogen gas, and a pump fluidly connected between the outlet, through the outlet valve, and the storage tank.

Aspects of the Disclosure Aspect 1. A metal-hydrogen battery, comprising:
a first electrode;
a second electrode; and
an electrolyte disposed between the first electrode and the second electrode,
wherein the second electrode includes a bi-functional catalyst to catalyze hydrogen evolution reaction and hydrogen oxidation reaction at the second electrode, and wherein the bi-functional catalyst comprises ruthenium or a ruthenium-containing compound.

Aspect 2. The metal-hydrogen battery of aspect 1, wherein the ruthenium-containing compound is selected from the group consisting of ruthenium phosphide, ruthenium sulfides, ruthenium carbide, ruthenium nitride, and ruthenium phosphide-sulfide.

Aspect 3. The metal-hydrogen battery of aspect 1 or 2, wherein the bi-functional catalyst comprises ruthenium phosphide.

Aspect 4. The metal-hydrogen battery of any preceding aspect, wherein the second electrode includes a conductive substrate and a coating covering the conductive substrate, and the coating includes the bi-functional catalyst.

Aspect 5. The metal-hydrogen battery of any preceding aspect, wherein the conductive substrate comprises a carbonaceous material.

Aspect 6. The metal-hydrogen battery of any preceding aspect, wherein the carbonaceous material is selected from the group consisting of carbon nanofiber paper, carbon cloth, carbon mat, carbon felt, carbon mat, carbon nanotube film, graphite foil, graphite foam, graphite mat, graphene foil, graphene fibers, graphene film, and graphene foam.

Aspect 7. The metal-hydrogen battery of any preceding aspect, wherein the coating includes nanostructures of the bi-functional catalyst.

Aspect 8. The metal-hydrogen battery of any preceding aspect, wherein the electrolyte is an aqueous electrolyte.

Aspect 9. The metal-hydrogen battery of aspect 8, wherein the electrolyte is acidic.

Aspect 10. The metal-hydrogen battery of aspect 9, wherein the electrolyte comprises $H_2SO_4$.

Aspect 11. The metal-hydrogen battery of aspect 9, wherein the first electrode comprises a material selected from the group consisting of PbO, $PbO_2$, and $PbO_2$ doped with one or more elements selected from the group consisting of Sb, Cr, and Ca.

Aspect 12. The metal-hydrogen battery of aspect 8, wherein the electrolyte has a pH below 10.

Aspect 13. The metal-hydrogen battery of aspect 12, wherein the electrolyte comprises a material selected from the group consisting of $MnCl_2$, $MnSO_4$, $Mn(NO_3)_2$, and $Mn(CH_3COO)_2$.

Aspect 14. The metal-hydrogen battery of aspect 13, wherein the electrolyte further comprises $H_2SO_4$.

Aspect 15. The metal-hydrogen battery of aspect 13, wherein the first electrode comprises a carbonaceous material.

Aspect 16. The metal-hydrogen battery of aspect 12, wherein the electrolyte comprises a salt of lithium.

Aspect 17. The metal-hydrogen battery of aspect 16, wherein the electrolyte comprises a salt selected from the group consisting of $Li_2SO_4$, LiCl, $LiNO_3$, $LiClO_4$, $Li_2CO_3$, $Li_3PO_4$, LiF, $LiPF_6$, and $LiBF_4$.

Aspect 18. The metal-hydrogen battery of aspect 16, wherein the first electrode comprises a material selected from the group consisting of $LiMn_2O_4$, $LiCo_2O_4$, $LiFeO_2$, $LiNiO_2$, $LiFePO_4$, lithium cobalt nickel oxide, lithium cobalt magnesium oxide, lithium manganese cobalt oxide, lithium manganese chromium oxide, lithium nickel manganese cobalt oxide, lithium cobalt phosphate, lithium vanadium oxide phosphate, and lithium vanadium phosphate fluoride.

Aspect 19. The metal-hydrogen battery of aspect 8, wherein the electrolyte is alkaline.

Aspect 20. The metal-hydrogen battery of aspect 19, wherein the electrolyte comprises an alkali.

Aspect 21. The metal-hydrogen battery of aspect 20, wherein the alkali is selected from the group consisting of KOH, NaOH, LiOH, and combinations thereof.

Aspect 22. The metal-hydrogen battery of aspect 20, wherein the first electrode comprises a material selected from the group consisting of $Ni(OH)_2$, NiOOH, $Ni(OH)_2$ doped with one or more elements selected from the group consisting of cobalt and zinc, and NiOOH doped with one or more elements selected from the group consisting of cobalt and zinc.

Aspect 23. The metal-hydrogen battery of any preceding aspect, further comprising an enclosure within which the first electrode, the second electrode, and the electrolyte are disposed, and the enclosure includes an inlet valve, an inlet, which is fluidly connected to the inlet valve, an outlet valve, and an outlet, which is fluidly connected to the outlet valve.

Aspect 24. The metal-hydrogen battery of aspect 23, further comprising a storage tank to store hydrogen gas, and a pump fluidly connected between the outlet, through the outlet valve, and the storage tank.

Aspect 25. A metal-hydrogen battery, comprising:
a first electrode comprising lead oxide;
a second electrode; and
an acidic electrolyte disposed between the first electrode and the second electrode, wherein the second electrode includes a bi-functional catalyst to catalyze hydrogen evolution reaction and hydrogen oxidation reaction at the second electrode.

Aspect 26. The metal-hydrogen battery of aspect 25, wherein the lead oxide is selected from the group consisting of $PbO_2$, PbO, and $PbO_2$ doped with one or more elements selected from the group consisting of Sb, Cr, and Ca.

Aspect 27. The metal-hydrogen battery of aspect 25, wherein the acidic electrolyte comprises $H_2SO_4$.

Aspect 28. A metal-hydrogen battery, comprising:
a first electrode comprising an inorganic lithium compound;
a second electrode; and
an electrolyte disposed between the first electrode and the second electrode, wherein the second electrode includes a bi-functional catalyst to catalyze hydrogen evolution reaction and hydrogen oxidation reaction at the second electrode.

Aspect 29. The metal-hydrogen battery of aspect 28, wherein the inorganic lithium compound is selected from the group consisting of $LiMn_2O_4$, $LiCo_2O_4$, $LiFeO_2$, $LiNiO_2$, $LiFePO_4$, lithium cobalt nickel oxide, lithium cobalt magnesium oxide, lithium manganese cobalt oxide, lithium manganese chromium oxide, lithium nickel manganese cobalt oxide, lithium cobalt phosphate, lithium vanadium oxide phosphate and lithium vanadium phosphate fluoride.

Aspect 30. The metal-hydrogen battery of aspect 28, wherein the electrolyte comprises a salt of lithium.

Aspect 31. The metal-hydrogen battery of aspect 28, wherein the salt is selected from the group consisting of $Li_2SO_4$, LiCl, $LiNO_3$, $LiClO_4$, $Li_2CO_3$, $Li_3PO_4$, LiF, $LiPF_6$, and $LiBF_4$.

Aspect 32. The metal-hydrogen battery of aspect 25 or 28, wherein the bi-functional catalyst comprises a metal or an alloy thereof.

Aspect 33. The metal-hydrogen battery of aspect 32, wherein the metal is selected from the group consisting of platinum, ruthenium, nickel, cobalt, molybdenum, tungsten, silver, palladium, iridium, gold, rhodium, manganese, and iron.

Aspect 34. The metal-hydrogen battery of aspect 32, wherein the bi-functional catalyst comprises ruthenium or a ruthenium-containing compound.

EXAMPLES

Example 1

Acidic Lead-Hydrogen Battery

Figure 4:
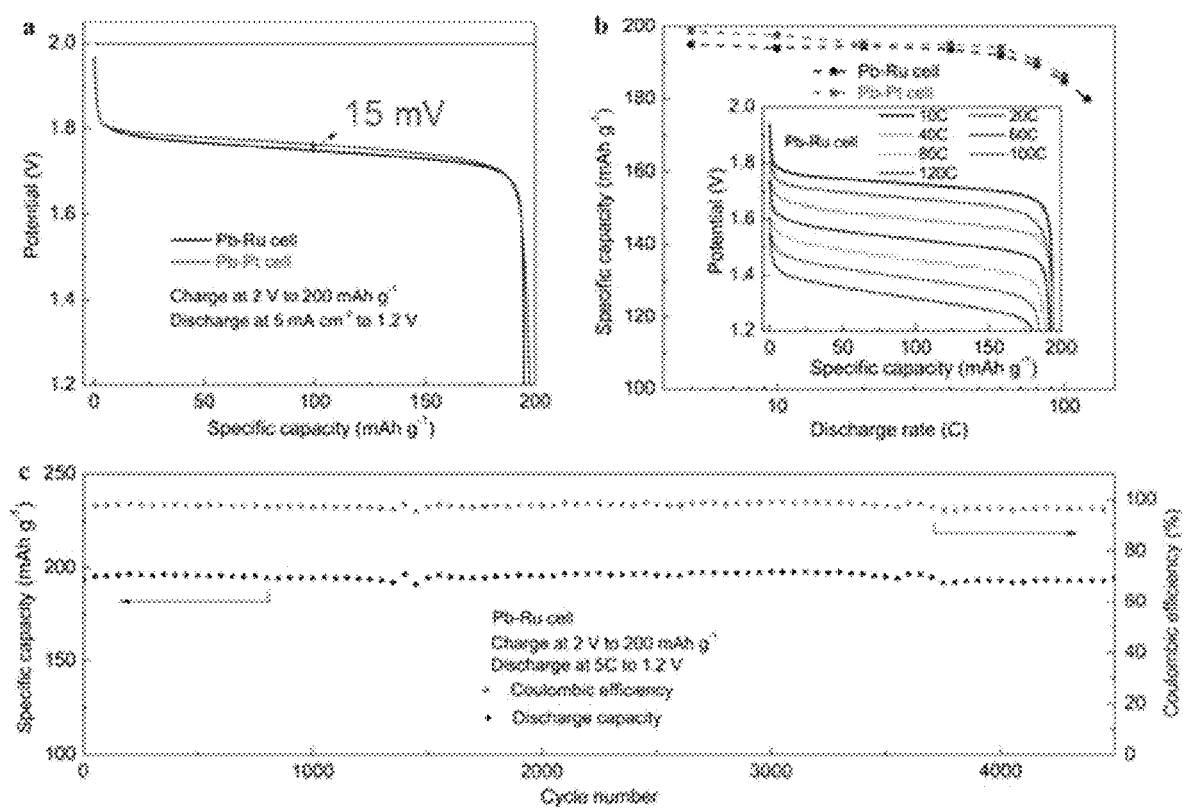
FIG. 4 shows a), b) comparisons of the electrochemical performance of acid lead-hydrogen batteries with Pb—Ru cell and Pb—Pt cell and c) long term cycle stability of Pb—Ru cell.

An acidic Pb—$H_2$ cell was developed for the first time by using commercial $PbO_2$ as cathode, $RuP_2$/C as hydrogen anode, and 4.5 M $H_2SO_4$ as electrolyte. FIG. 4 shows the electrochemical performance of the Pb—$H_2$ cells. The electrochemical performance of the Pb—$H_2$ cell using $RuP_2$/C as the electrocatalyst (denoted as Pb—Ru cell) is comparable to the cell using Pt/C as the electrocatalyst (denoted as Pb—Pt cell). Specifically, the Pb—Ru cell shows similar discharge behavior as that of the Pb—Pt cell, demonstrating the desired electrochemical performance of $RuP_2$/C as the hydrogen catalyst. The average discharge potential of the Pb—Ru cell is calculated to be ~1.75 V, which is only ~15 mV lower than that of the Pb—Pt cell. It is observed that the Pb—Ru cell exhibits similar rate capability to that of the Pb—Pt cell. FIG. 4 panel b are the discharge curves of the Pb—Ru cell under different current densities, showing a high degree capacity retention at high current density up to 100 mA $cm^{-2}$. The Pb—Ru cell exhibits improved rechargeability, showing negligible capacity decay after 4500 cycles (FIG. 4 panel c). It is well-known that the capacity degradation of the conventional lead-acid battery is caused by the irreversible redox reaction of Pb/Pb $SO_4$ induced sulfation at the Pb anode. By replacing the Pb anode with a catalytic hydrogen anode, the issue of the anode sulfation can be solved completely. Additionally, owing to the utilization of the $RuP_2$/C catalyst, the cost of the Pb—Ru cell is significantly reduced as comparable to that of the Pb—Pt cell.

Example 2

Neutral Mn—$H_2$ Battery

Figure 5:
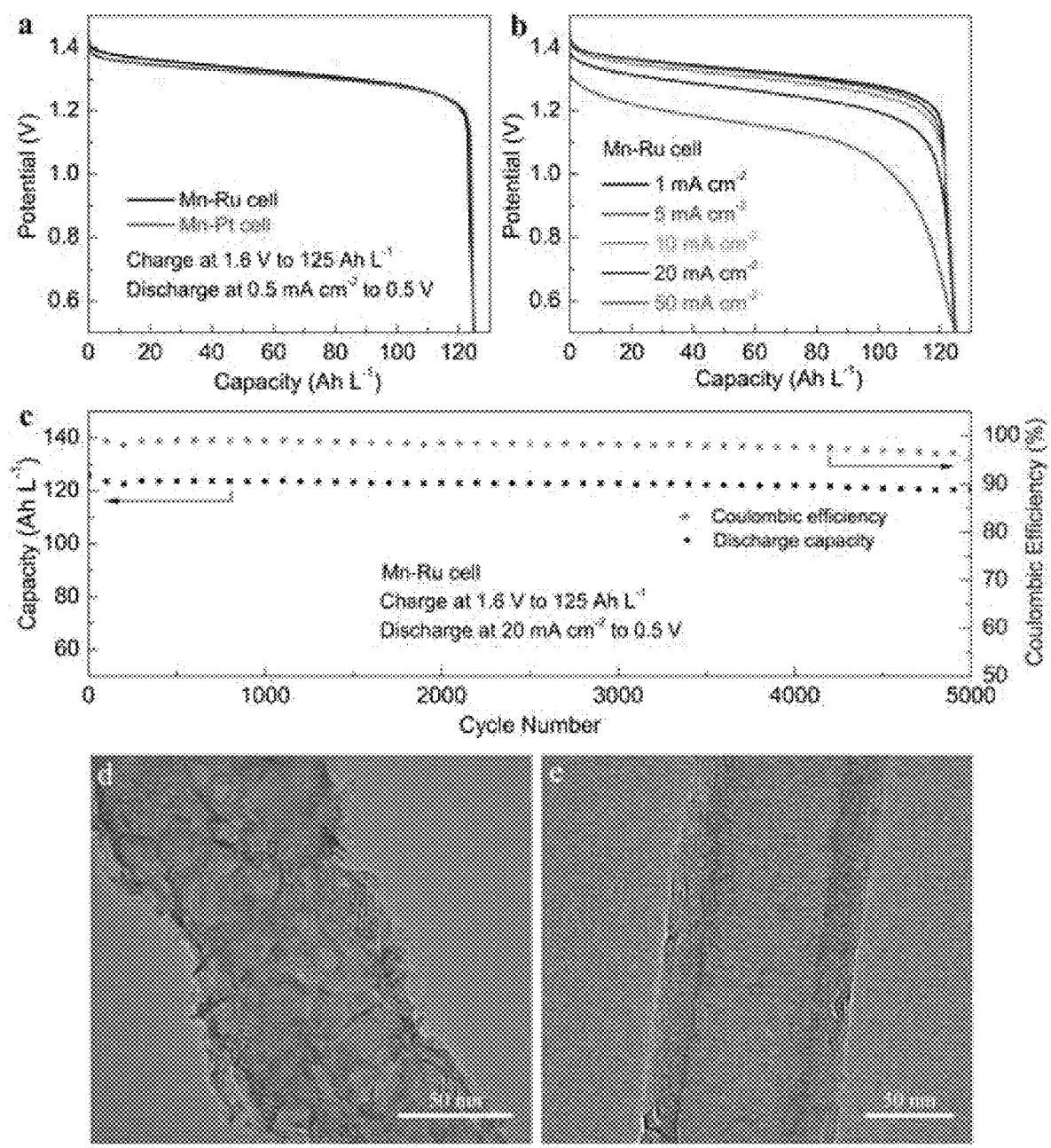
FIG. 5 shows a), b) comparisons of the electrochemical performance of neutral manganese-hydrogen batteries with Mn—Ru cell and Mn—Pt cell, c) long term cycle stability of Mn—Ru cell, and characterizations of the Mn—Ru cell after e) charging and f) discharging.
Figure 9:
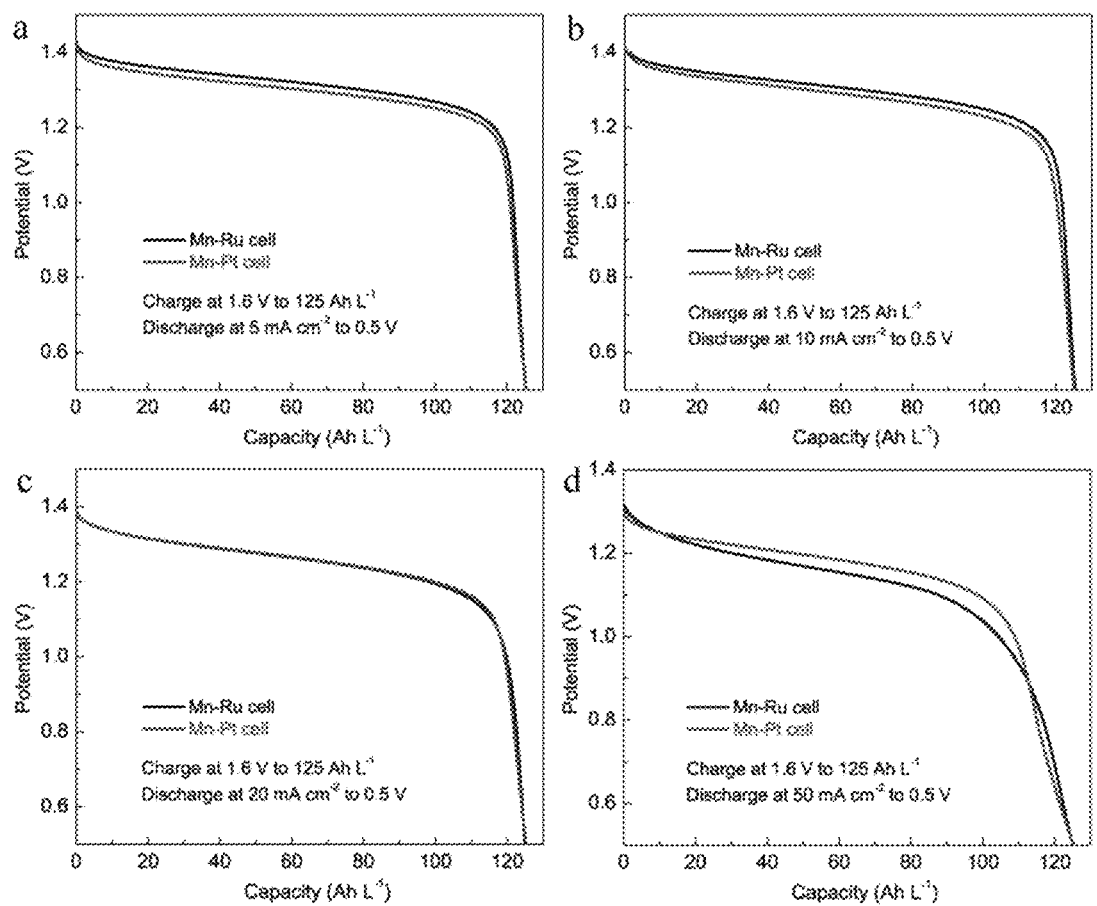
FIG. 9 panels a, b, c, and d show the discharge curves of Mn—Ru and Mn—Pt cells.
Figure 10:
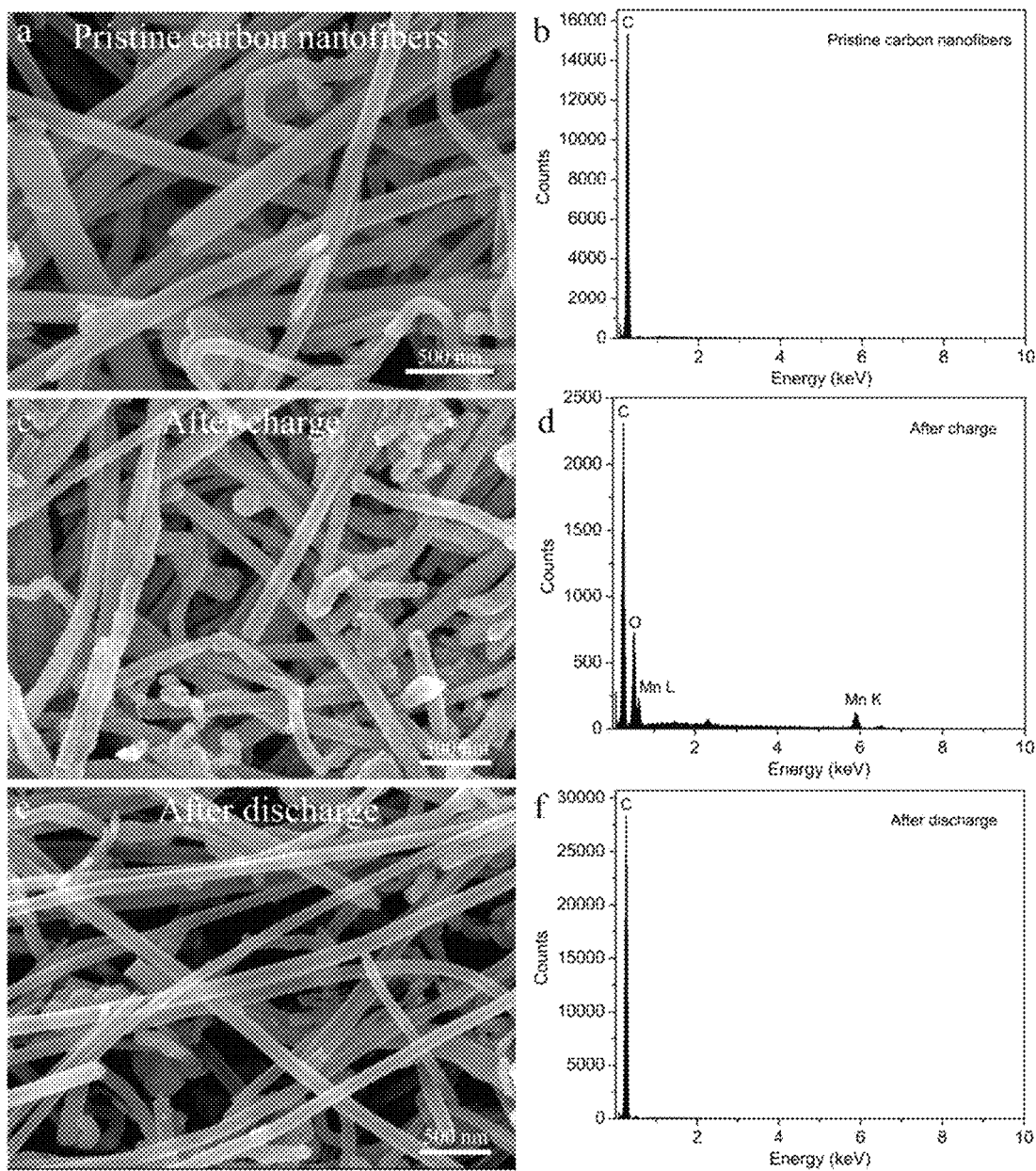
FIG. 10 shows characterizations of a), b) pristine carbon nanofibers, c), d) the Mn—Ru cell cathode after charging, and e), f) the Mn—Ru cell cathode after discharging.
Figure 11:
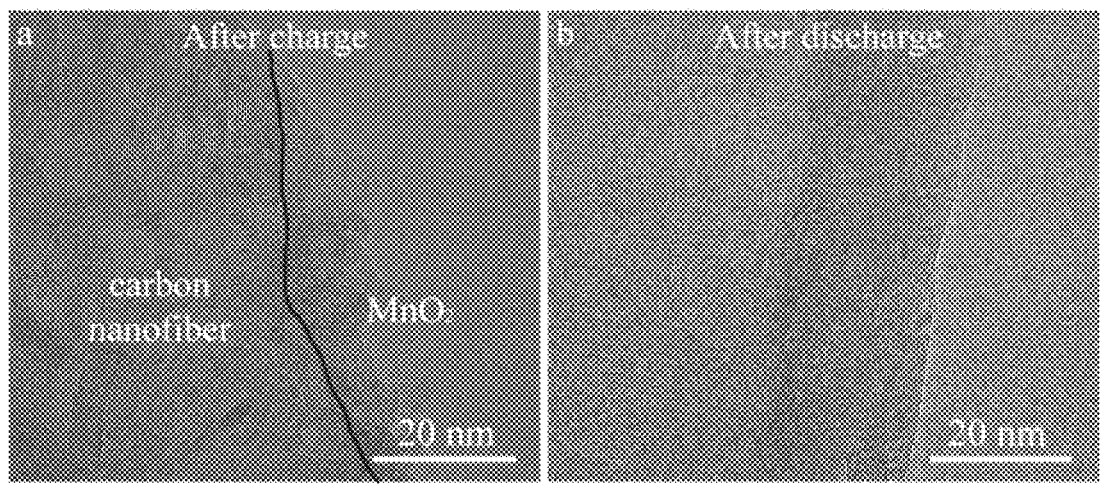
FIG. 11 shows characterizations of the Mn—Ru cell cathode during a) charge and b) discharge.

The Mn—$H_2$ battery can be operated in both neutral and mild acidic electrolytes. The fabrication of the Mn—$H_2$ battery is achieved by using carbon nanofiber paper as the cathode substrate, $RuP_2$/C as the hydrogen anode electrocatalyst, and 3 M $MnSO_4$ or 3 M $MnSO_4$ with an addition of 50 mM $H_2SO_4$ as the electrolyte. FIG. 5 shows the electrochemical performance of the Mn—H cell using both $RuP_2$/C and Pt/C as the hydrogen anodes. The Mn—H cell using $RuP_2$/C as electrocatalyst (denoted as Mn—Ru cell) shows comparable performance to the Mn—H cell using Pt/C as electrocatalyst (denoted as Mn—Pt cell). The discharge behavior (FIG. 5 panel a) and rate capability (FIG. 5 panel b) of the Mn—Ru cell is comparable to that of the Mn—Pt cell (FIG. 9). It is further demonstrated that the Mn—Ru cell has a high capacity of ~125 Ah which is similar to the Mn—Pt cell with capacity of ~124.8 Ah $l^{-1}$. In addition, the Mn—Ru cell shows stable cycle life with negligible capacity decay after 5000 cycles (FIG. 5 panel c). SEM (FIG. 10) and TEM (FIG. 5 panel d, FIG. 11) characterization confirmed the energy storage mechanism of the Mn—Ru cell.

Example 3

Neutral LMO-$H_2$ Battery

Figure 12:
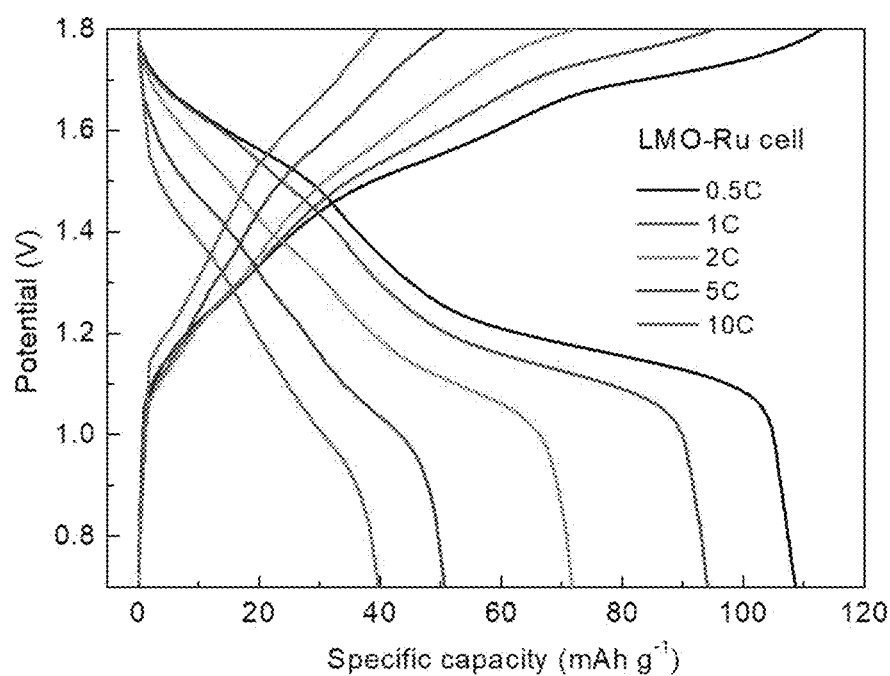
FIG. 12 shows the charge-discharge curves of the LMO-Ru cell at different rates.

The LMO-$H_2$ battery was fabricated by using a $LiMn_2O_4$ cathode, $RuP_2$/C as hydrogen anode, and 1M $Li_2SO_4$ as electrolyte. FIG. 12 shows typical charge-discharge curves of the LMO-Ru battery at different rates. The LMO-Ru cell exhibits discharge potential of ~1.3 V and specific capacity of ~108 mAh $g^{-1}$ at 0.5 C, demonstrating the successful development of the LMO-$H_2$ battery.

Example 4

Alkaline Nickel-Hydrogen Battery

Figure 6:
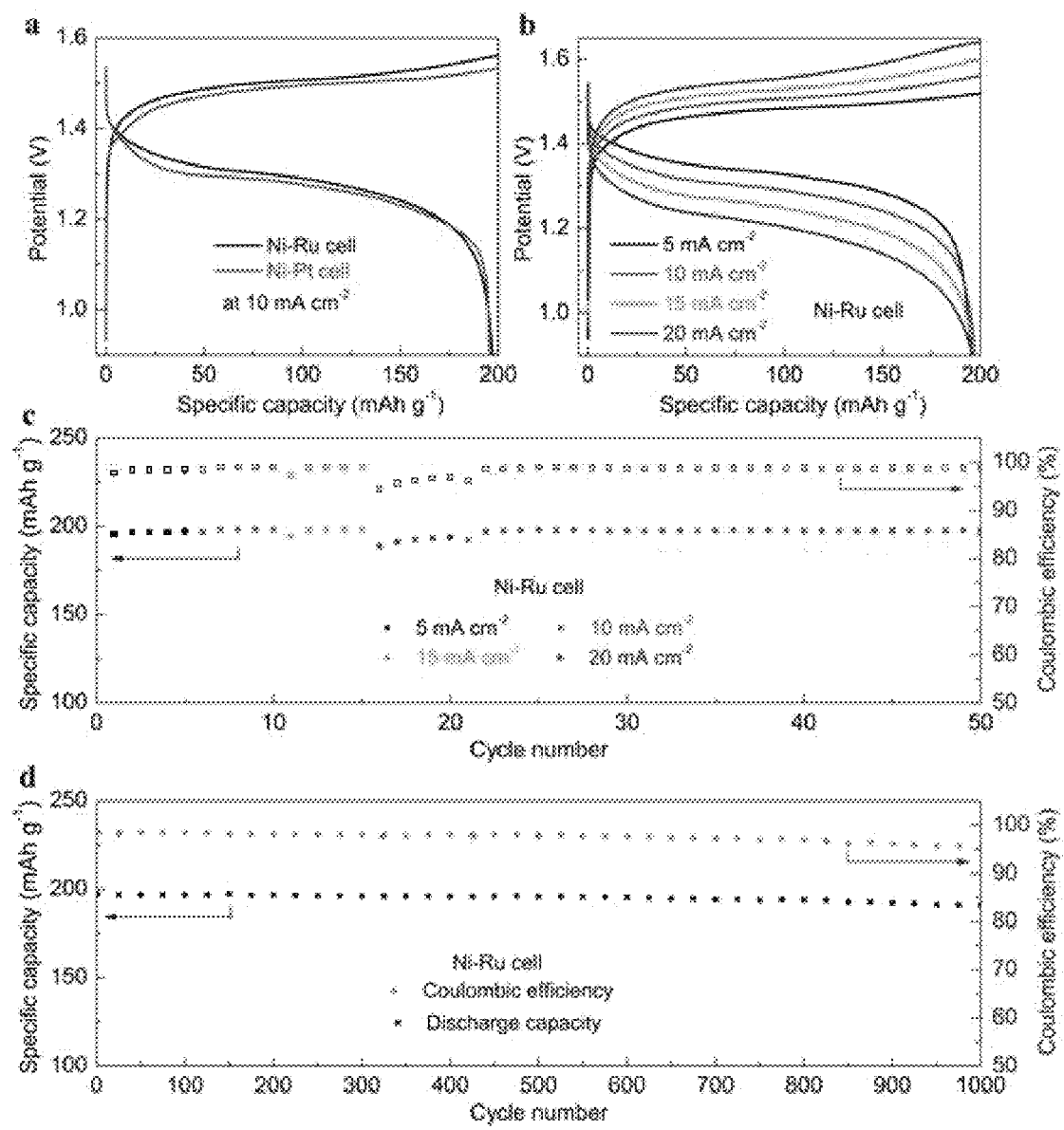
FIG. 6 shows a), b) comparisons of the electrochemical performance of alkaline nickel-hydrogen batteries, c) the specific capacity of Ni—Ru cell at different current densities, and d) long term cycle stability of Ni—Ru cell.

The alkaline Ni— $H_2$ battery is fabricated by using industrially mature $Ni(OH)_2$/NiOOH as cathode and $RuP_2$/C as hydrogen anode in 30% KOH electrolyte. The Ni—H battery using $RuP_2$/C and Pt/C electrocatalysts are denoted as Ni—Ru and Ni—Pt cells, respectively. The electrochemical performance of such Ni—Ru and Ni—Pt cells are demonstrated in FIG. 6 panel a. The Ni—Ru cell shows comparable charge-discharge behavior to the Ni—Pt cell (FIG. 6 panel a). It also exhibits desired rate capability (FIG. 6 panel b) and capacity retention under different current densities (FIG. 6 panel c). Furthermore, the Ni—Ru cell shows stable cycle life of 1000 cycles (FIG. 6 panel d).

Example 5

Fabrication and Electrocatalytic Activity of $RuP_2$/C

The $RuP_2$/C was prepared by a two-step chemistry method, where the $RuCl_3$ and phytic acid were uniformly mixed by dissolution in DI water under stirring at room temperature for 1 h followed by freezing drying for 3 days. In situ formation of $RuP_2$ and carbon was achieved by annealing the solid precursor at 800° C. in argon for 2 h with a ramping rate of 5° C. per minute. Sample was cooled at room temperature and washed with 3 M $H_2SO_4$ followed by DI water and vacuum dried at 80° C. for 12 h.

$RuP_2$/C powder was mixed with PVDF with a mass ratio of 9:1 in NMP to form slurry with a concentration of ~20 mg $ml^{-1}$. The suspension was stirred for ~24 hours and then subjected to a bath sonication of ~30 minutes before coating onto nickel foam or gas diffusion electrode. The nickel foam was immersed into the $RuP_2$/C suspension for ~1 minute and then taken out for drying in vacuum oven at 80° C. for ~24 hours. Multiple times of the immersion-soaking-drying process were applied to increase the loading of $RuP_2$/C on the nickel foam. The $RuP_2$/C suspension was dropped casted onto the gas diffusion electrodes and dried in a vacuum oven at 80° C. for ~24 hours.

Ru/C electrodes were fabricated by identical method except no phytic acid was added to the precursor.

Figure 2:
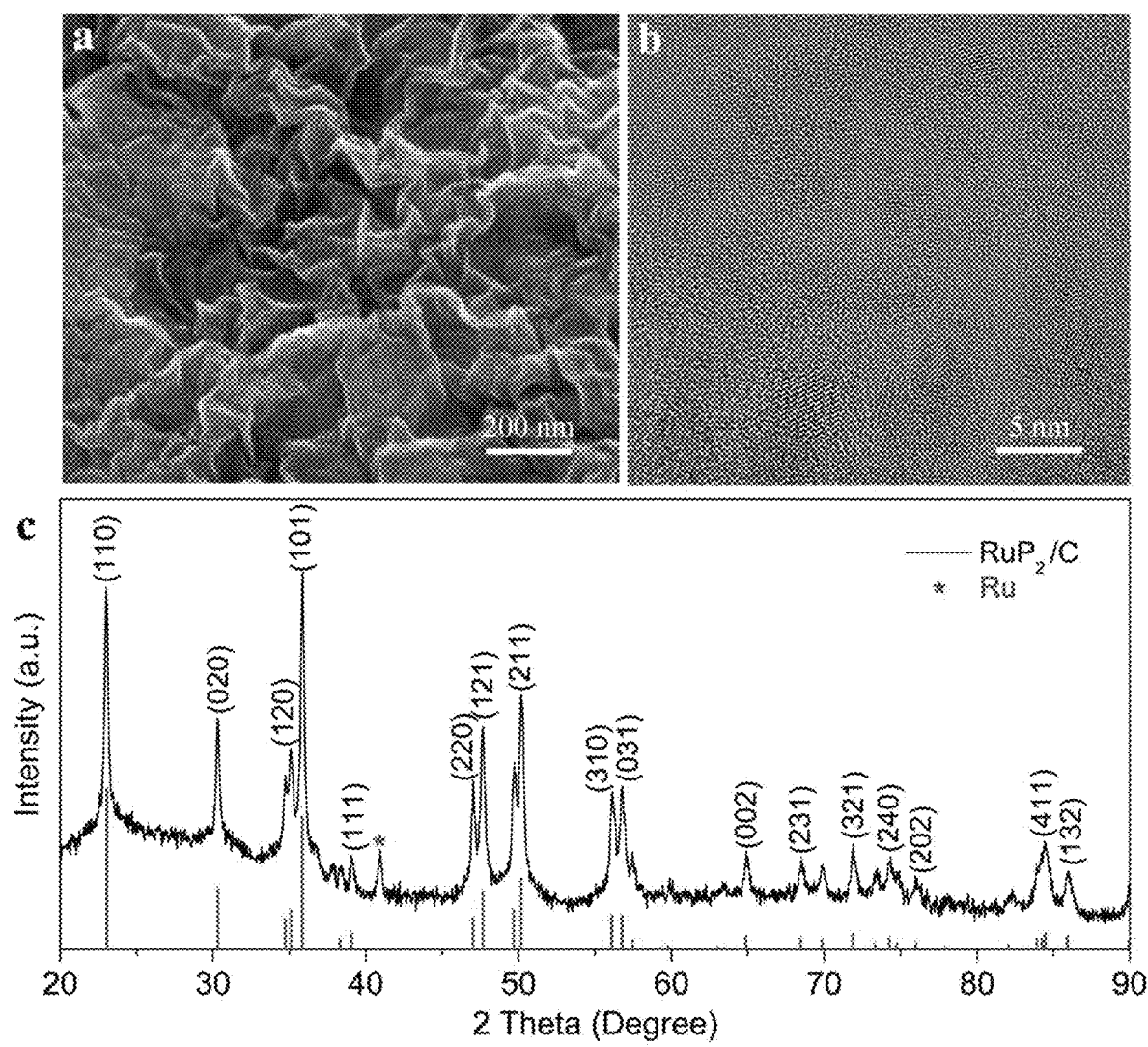
FIG. 2 panels a, b, and c show characterizations of a $RuP_2$/C electrocatalyst.
Figure 7:
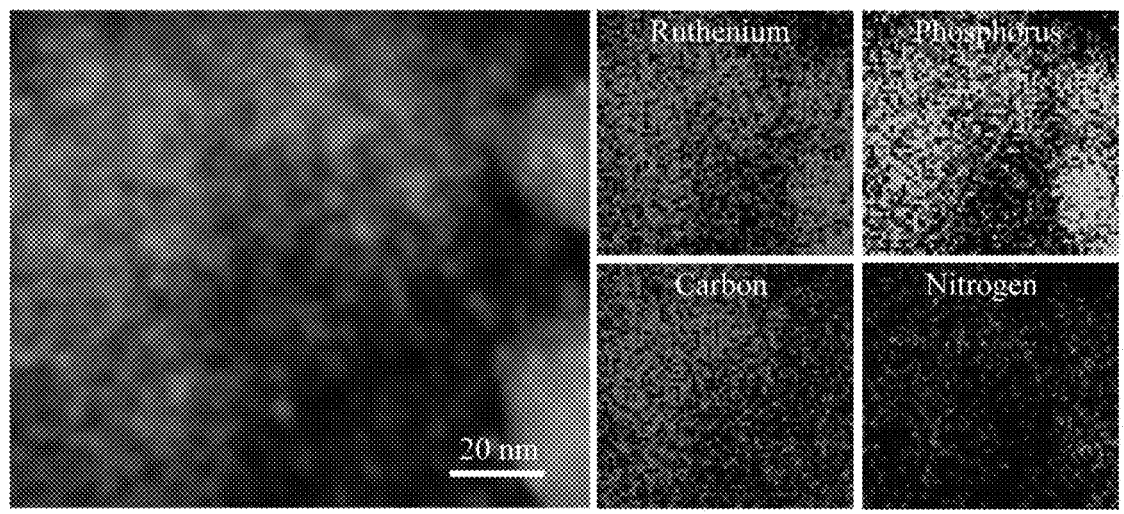
FIG. 7 shows characterizations of a $RuP_2$/C electrocatalyst.
Figure 8:
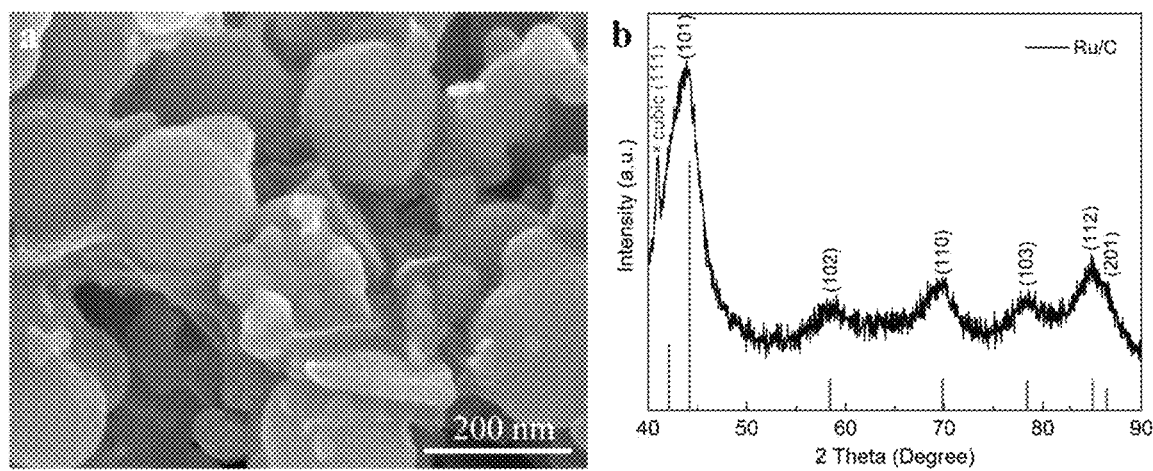
FIG. 8 panels a and b show characterizations of a Ru/C electrocatalyst.

The RuP$_2$/C shows morphology of nanoparticles with size of 2-5 nm that are anchored on the entangled nanoflakes (FIG. 2 panels a and b). Scanning transmission electron microscopy image and elemental mapping of the RuP$_2$/C show the uniformly distributed nanoparticles and the corresponding elements of Ru, P, C and N (FIG. 7). FIG. 2 panel c shows the XRD spectra of the RuP$_2$/C, confirming the composition and crystal structure of the electrocatalyst. To distinguish the advantage of the synthesized RuP$_2$/C, a control sample of Ru/C was prepared by the similar method where no phytic acid was involved in the process. It is shown that Ru nanoparticles with sizes between 20 and 200 nm are formed in the Ru/C composite (FIG. 8 panel a). The Ru/C is comprised of cubic and hexagonal crystal structures (FIG. 8 panel b).

Figure 3:
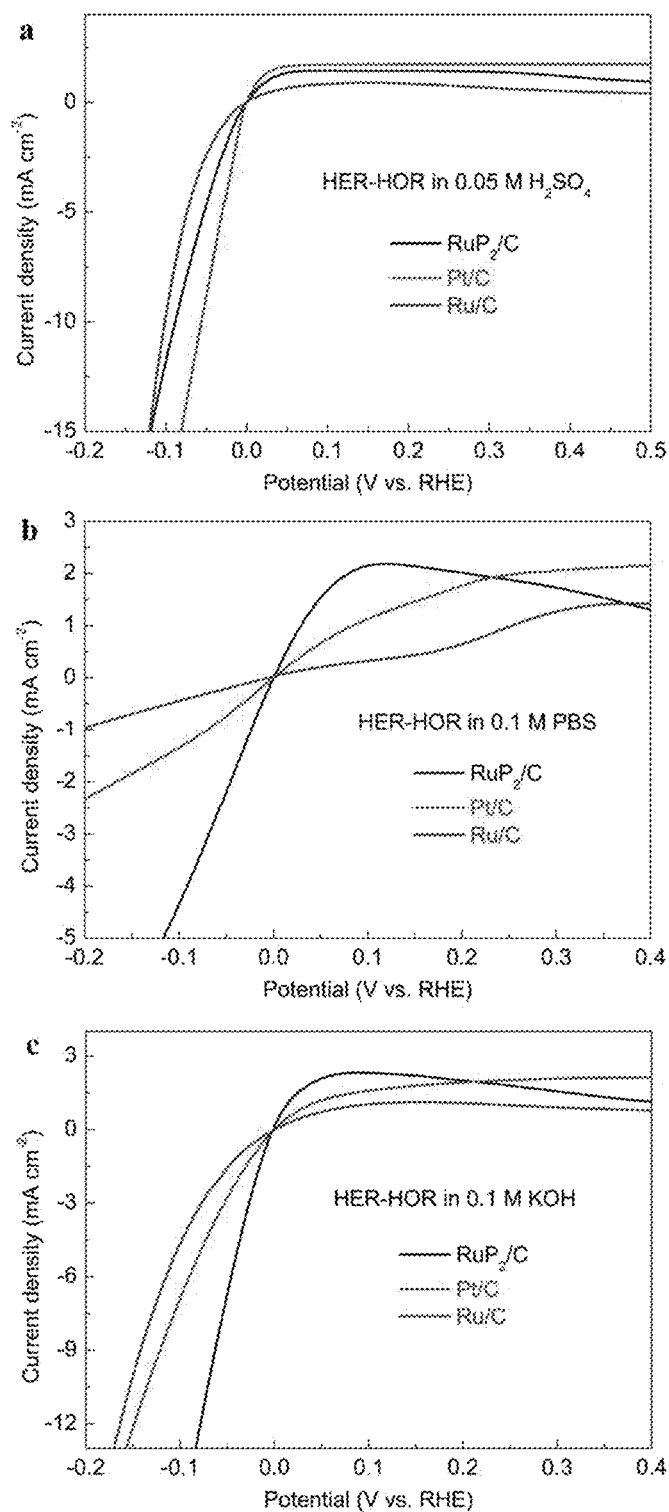
FIG. 3 panels a, b, and c show the electrochemical performance of the $RuP_2$/C electrocatalyst in different electrolytes.

The electrocatalytic activity of the RuP$_2$/C towards HER and HOR was studied by typical rotating disc electrode (RDE) measurements in different H$_2$ saturated electrolytes (FIG. 3). The state-of-the-art Pt/C and the synthesized Ru/C electrocatalysts were included as control. The polarization curve of the RuP$_2$/C shows good HER/HOR performance, which is comparable to that of the state-of-the-art Pt/C catalyst and superior to that of the Ru/C. The negligible overpotential and high specific activity of the RuP$_2$/C electrocatalyst manifest the superb HER/HOR activity of the RuP$_2$/C in all pH ranges.

Example 6

Electrocatalytic Performance of the RuP$_2$/C Electrocatalyst in Different Electrolytes The electrocatalytic activity of the RuP$_2$/C towards HER and HOR was studied by typical rotating disc electrode (RDE) measurements in different H$_2$ saturated electrolytes: 0.05 M H$_2$SO$_4$, 0.1 M PBS, and 0.1 M KOH (FIG. 3). The state-of-the-art Pt/C and the synthesized Ru/C electrocatalysts were included as control. The polarization curve of the RuP$_2$/C shows good HER/HOR performance, which is comparable to that of the state-of-the-art Pt/C catalyst and superior to that of the Ru/C. The negligible overpotential and high specific activity of the RuP$_2$/C electrocatalyst manifest the superb HER/HOR activity of the RuP$_2$/C in all pH ranges. FIGS. 15-17 overlay RDE measurements at different rotational speeds.

Methods
Fabrication of PbO$_2$, LiMn$_2$O$_4$, and Ni(OH)$_2$ Electrodes

The PbO$_2$ and Ni(OH)$_2$ electrodes were obtained from commercial lead-acid and nickel-metal hydride (Eneloop, Panasonic) batteries, and used as cathodes for Pb—H$_2$ and Ni—H$_2$ batteries, respectively. The LiMn$_2$O$_4$ cathode was prepared by mixing LiMn$_2$O$_4$ power with PVDF and super P in a ratio of 8:1:1 in NMP to form slurry and casted onto stainless steel foil using doctor blades. The LiMn$_2$O$_4$ cathode was subsequently dried in vacuum oven at temperature of 80° C. for 24 hours.

Electrochemical Measurements

The electrochemical measurements of the cells were carried out in a Biologic VMP3 multi-channel electrochemical workstation (Bio-Logic Inc. France). Galvanostatic charge-discharge measurements were performed by charging the cells at different currents to a cut-off capacity and discharging them to a set cut-off voltage. Constant voltage charge and constant current discharge were applied to Pb—H2 and Mn—H2 batteries. All measurements were done at room temperature (~20° C.).

The electrocatalytic activity of the RuP$_2$/C, Ru/C and Pt/C catalysts toward HER/HOR was carried out by rotation disc electrode (RDE) measurement in a typical three-electrode configuration by taking the catalysts as working electrodes, saturated calomel electrode (SCE) as reference electrode and a graphite rod as counter electrode. The reference electrode was calibrated with respect to reversible hydrogen electrode (RHE) in H$_2$ saturated 0.1 M KOH electrolyte, yielding a relation of E(RHE)=E(SCE)+1.01 V. To prepare the catalysts on RDE electrodes, different catalysts were dispersed in a mixture of ethanol and DI water (volume ratio of 1:1) by adding 5 wt % of Nafion to form homogeneous ink under bath sonication for ~30 min. Subsequently, 10 μl of the suspension was drop casted onto the glassy carbon RDE (diameter of 5 mm) and then vacuum dried. Cyclic voltammetry and linear sweep voltammetry curves were recorded at 5 mV s$^{-1}$. The reported current density is normalized to the geometric area of the electrodes.

Material Characterization

The catalysts were characterized by X-ray diffraction (XRD), scanning electron microscopy (SEM) and transmission electron microscopy (TEM). The crystallinity and structure of the materials were examined by PANalytical X'Pert diffractometer using copper K-edge X-rays. The morphology of the products was observed by FEI XL30 Sirion SEM. TEM and energy-dispersive X-ray spectroscopy (EDS) were conducted on FEI Tecnai G2 F20 X-TWIN TEM.

Unless otherwise defined, all technical and scientific terms used herein have the same meaning as commonly understood by one of ordinary skill in the art to which this invention belongs.

The inventions illustratively described herein may suitably be practiced in the absence of any element or elements, limitation or limitations, not specifically disclosed herein. Thus, for example, the terms "comprising", "including," "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed.

Thus, it should be understood that although the present invention has been specifically disclosed by preferred embodiments and optional features, modification, improvement and variation of the inventions embodied therein herein disclosed may be resorted to by those skilled in the art, and that such modifications, improvements and variations are considered to be within the scope of this invention. The materials, methods, and examples provided here are representative of preferred embodiments, are exemplary, and are not intended as limitations on the scope of the invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

In addition, where features or aspects of the invention are described in terms of Markush groups, those skilled in the art will recognize that the invention is also thereby described in terms of any individual member or subgroup of members of the Markush group.

All publications, patent applications, patents, and other references mentioned herein are expressly incorporated by reference in their entirety, to the same extent as if each were incorporated by reference individually. In case of conflict, the present specification, including definitions, will control.

It is to be understood that while the disclosure has been described in conjunction with the above embodiments, that the foregoing description and examples are intended to illustrate and not limit the scope of the disclosure. Other aspects, advantages and modifications within the scope of the disclosure will be apparent to those skilled in the art to which the disclosure pertains.

What is claimed is:

1. A metal-hydrogen battery, comprising:
a first electrode comprising a carbonaceous material and one of:
a material selected from the group consisting of PbO, $PbO_2$, and $PbO_2$ doped with one or more elements selected from the group consisting of Sb, Cr, and Ca, or
a material selected from an oxide of Mn, or
a material selected from the group consisting of $LiMn_2O_4$, $LiCo_2O_4$, $LiFeO_2$, $LiNiO_2$, $LiFePO_4$, lithium cobalt nickel oxide, lithium cobalt magnesium oxide, lithium manganese cobalt oxide, lithium manganese chromium oxide, lithium nickel manganese cobalt oxide, lithium cobalt phosphate, lithium vanadium oxide phosphate, and lithium vanadium phosphate fluoride, or
a material selected from the group consisting of $Ni(OH)_2$, NiOOH, $Ni(OH)_2$ doped with one or more elements selected from the group consisting of cobalt and zinc, and NiOOH doped with one or more elements selected from the group consisting of cobalt and zinc;
a second electrode comprising a porous substrate and a coating coated on the porous substrate; and
an electrolyte disposed between the first electrode and the second electrode, wherein the electrolyte has a pH value selected from −1 and 15 depending on a selection of the materials of the first electrode,
wherein the second electrode generates hydrogen gas during charging and oxidizes hydrogen gas during discharging, and includes a porous substrate and a coating coated on the porous substrate, wherein the coating comprises a bi-functional catalyst to catalyze hydrogen evolution reaction and hydrogen oxidation reaction at the second electrode, and wherein the bi-functional catalyst comprises entangled carbon nanoflakes and nanoparticles of ruthenium sulfide anchored on the entangled carbon nanoflakes, wherein the bi-functional catalyst including the nanoparticles anchored on the entangled carbon nanoflakes is coated on a surface of the porous substrate.

2. The metal-hydrogen battery of claim 1, wherein the electrolyte is an aqueous electrolyte.

3. The metal-hydrogen battery of claim 1, wherein when the first electrode comprises the material selected from the group consisting of PbO, $PbO_2$, and $PbO_2$ doped with one or more elements selected from the group consisting of Sb, Cr, and Ca, the electrolyte is acidic.

4. The metal-hydrogen battery of claim 3, wherein the electrolyte comprises $H_2SO_4$.

5. The metal-hydrogen battery of claim 1, wherein when the first electrode comprises the material selected from an oxide of Mn, the electrolyte comprises a material selected from the group consisting of $MnCl_2$, $MnSO_4$, $Mn(NO_3)_2$, and $Mn(CH_3COO)_2$.

6. The metal-hydrogen battery of claim 1, wherein when the first electrode comprises the material selected from the group consisting of $LiMn_2O_4$, $LiCo_2O_4$, $LiFeO_2$, $LiNiO_2$, $LiFePO_4$, lithium cobalt nickel oxide, lithium cobalt magnesium oxide, lithium manganese cobalt oxide, lithium manganese chromium oxide, lithium nickel manganese cobalt oxide, lithium cobalt phosphate, lithium vanadium oxide phosphate, and lithium vanadium phosphate fluoride, the electrolyte comprises a salt of lithium.

7. The metal-hydrogen battery of claim 1, wherein when the first electrode comprises the material selected from the group consisting of $Ni(OH)_2$, NiOOH, $Ni(OH)_2$ doped with one or more elements selected from the group consisting of cobalt and zinc, and NiOOH doped with one or more elements selected from the group consisting of cobalt and zinc, the electrolyte is alkaline.

8. The metal-hydrogen battery of claim 7, wherein the electrolyte comprises an alkali selected from the group consisting of KOH, NaOH, LiOH, and combinations thereof.

9. A metal-hydrogen battery, comprising:
a first electrode comprising a carbonaceous material and one of:
a material selected from the group consisting of PbO, $PbO_2$, and $PbO_2$ doped with one or more elements selected from the group consisting of Sb, Cr, and Ca, or
a material selected from an oxide of Mn, or
a material selected from the group consisting of $LiMn_2O_4$, $LiCo_2O_4$, $LiFeO_2$, $LiNiO_2$, $LiFePO_4$, lithium cobalt nickel oxide, lithium cobalt magnesium oxide, lithium manganese cobalt oxide, lithium manganese chromium oxide, lithium nickel manganese cobalt oxide, lithium cobalt phosphate, lithium vanadium oxide phosphate, and lithium vanadium phosphate fluoride, or
a material selected from the group consisting of $Ni(OH)_2$, NiOOH, $Ni(OH)_2$ doped with one or more elements selected from the group consisting of cobalt and zinc, and NiOOH doped with one or more elements selected from the group consisting of cobalt and zinc;
a second electrode comprising a porous substrate and a coating coated on the porous substrate; and
an electrolyte disposed between the first electrode and the second electrode, wherein the electrolyte has a pH value selected from −1 and 15 depending on a selection of the materials of the first electrode,
wherein the second electrode generates hydrogen gas during charging and oxidizes hydrogen gas during discharging, and includes a porous substrate and a coating coated on the porous substrate, wherein the coating comprises a bi-functional catalyst to catalyze hydrogen evolution reaction and hydrogen oxidation reaction at the second electrode, and wherein the bi-functional catalyst comprises entangled carbon nanoflakes and nanoparticles of ruthenium phosphide-sulfide anchored on the entangled carbon nanoflakes, wherein the bi-functional catalyst including the nanoparticles anchored on the entangled carbon nanoflakes is coated on a surface of the porous substrate.

10. The metal-hydrogen battery of claim 9, wherein when the first electrode comprises the material selected from the group consisting of $PbO_2$, PbO, and $PbO_2$ doped with one or more elements selected from the group consisting of Sb, Cr, and Ca, the electrolyte is acidic.

11. The metal-hydrogen battery of claim 10, wherein the electrolyte comprises $H_2SO_4$.

12. The metal-hydrogen battery of claim 9, wherein when the first electrode comprises the material selected from the group consisting of $LiMn_2O_4$, $LiCo_2O_4$, $LiFeO_2$, $LiNiO_2$, $LiFePO_4$, lithium cobalt nickel oxide, lithium cobalt magnesium oxide, lithium manganese cobalt oxide, lithium manganese chromium oxide, lithium nickel manganese cobalt oxide, lithium cobalt phosphate, lithium vanadium oxide phosphate and lithium vanadium phosphate fluoride, the electrolyte comprises a salt of lithium.

13. The metal-hydrogen battery of claim 9, wherein when the first electrode comprises the material selected from an oxide of Mn, the electrolyte comprises a material selected from the group consisting of $MnCl_2$, $MnSO_4$, $Mn(NO_3)_2$, and $Mn(CH_3COO)_2$.

14. The metal-hydrogen battery of claim 9, wherein when the first electrode comprises the material selected from the group consisting of $Ni(OH)_2$, NiOOH, $Ni(OH)_2$ doped with one or more elements selected from the group consisting of cobalt and zinc, and NiOOH doped with one or more elements selected from the group consisting of cobalt and zinc, the electrolyte is alkaline.

15. The metal-hydrogen battery of claim 14, wherein the electrolyte comprises an alkali selected from the group consisting of KOH, NaOH, LiOH, and combinations thereof.

16. The metal-hydrogen battery of claim 9, wherein the electrolyte is an aqueous electrolyte.

* * * * *